J. ADAMS.

Jelly Glasses.

No. 5,921. Reissued June 16, 1874.

WITNESSES

Frederick Standish

James P. Kay

INVENTOR

John Adams by Bakewell & Kerr

Att'ys

UNITED STATES PATENT OFFICE.

JOHN ADAMS, OF PITTSBURG, PENNSYLVANIA.

IMPROVEMENT IN JELLY-GLASSES.

Specification forming part of Letters Patent No. 138,833, dated May 13, 1873; reissue No. 5,921. dated June 16, 1874; application filed April 28, 1874.

*To all whom it may concern:*

Be it known that I, JOHN ADAMS, of Pittsburg, in the county of Allegheny and State of Pennsylvania, have invented a new and useful Improvement in Lids for Jelly-Glasses; and I do hereby declare the following to be a full, clear, and exact description thereof.

The nature of my invention consists in providing a jelly-glass with a "slip-top" lid, so constructed that a disk of paper may be interposed between the lid and cover the mouth of the jelly-glass, the lid having a plain portion of sufficient size to expose to view the paper beneath, and in the interposition of a disk of paper between the flange of a glass slip-top lid and the lip of a jelly-glass in such a manner as to cover the mouth of the glass, whereby the space between the flange and lip is filled, the moisture arising from the contents of the glass acting upon the paper, causing it to adhere to the glass to the exclusion of air and dust, and retaining the lid firmly in position, without the use of rubber gaskets or screw-threads.

To enable others skilled in the art to make and use my invention, I will proceed to describe more fully its construction and operation.

Figure 1:
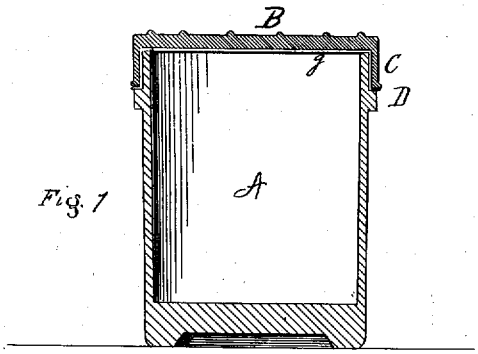
Figure 2:
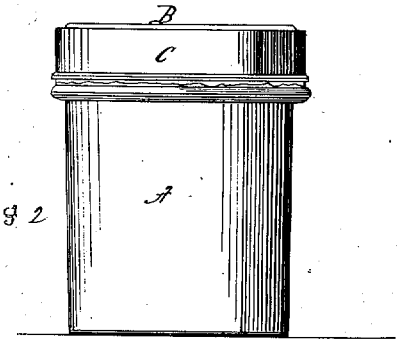
Figure 3:
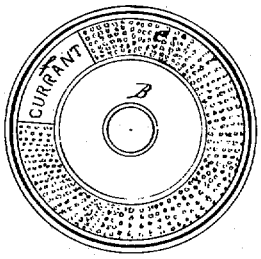

In the accompanying drawing, which forms part of my specification, Figure 1 is a vertical section of the jelly-glass and lid. Fig. 2 is a side elevation of the same. Fig. 3 is a top view or plan of the same.

In the accompanying drawing, A represents an ordinary jelly-glass. B represents the top, which is known to the trade as a slip-top, which is a top having a flange that will easily pass over the mouth of the vessel for which it is intended. In the present case the top is constructed of pressed glass, with the bevel of the inner wall of its flange C corresponding to the outer wall of that portion of the jelly-glass known as the lip, which is the part above the bead D of the jelly-glass A, leaving sufficient space between the lip and the flange C for the interposition of a paper cover, upon which, if desired, characters may be made to indicate the contents of the glass. This paper is used for the purpose of covering the mouth of the jelly-glass and filling up the space between the flange and the lip, and experience has demonstrated that such paper will become impervious to the action of the air, and, as a general thing, will become attached to the mouth of the jelly-glass, excluding from it air, dust, and other thing or things, which would have a tendency to injure the jelly placed in the glass. This tendency of the paper to become impervious to the air and become adhesive so as to adhere to the glass is due to the vapor or moisture emanating from the jelly, which, in this instance, I so utilize as to make it available for the protection of the jelly and for retaining the lid firmly in position without the use of a rubber gasket or screw-thread. The lid is constructed by means of a suitable mold and press, and a portion of the surface of it is made semi-opaque or frosted, as indicated at *e*, leaving a plain part, as indicated at *f*, of sufficient size to expose to view the paper beneath. *g* represents the paper which covers the mouth of the jelly-glass, a portion of the paper being interposed between the lip and flange C, as indicated in Fig. 1.

I wish it clearly understood that I do not claim, broadly, a glass top for jelly-glasses, for such device is known; but

What I claim as of my invention is—

1. A slip-top lid for jelly-glasses, provided with a plain surface, *f*, so that portions of a paper disk interposed between the lid and the glass may be exposed to view, substantially as and for the purpose specified.

2. In combination with a jelly-glass, having a glass slip-top lid, a paper disk interposed between the flange of the lid and the lip of the glass, and covering the mouth of the glass, substantially as and for the purpose specified.

In witness whereof I, the said JOHN ADAMS, have hereunto set my hand.

JOHN ADAMS.

Witnesses:
W. N. PAXTON,
JAMES I. KAY.